United States Patent
Murad et al.

(10) Patent No.: US 10,607,092 B2
(45) Date of Patent: Mar. 31, 2020

(54) SYSTEM AND METHOD FOR DETECTING THE POSITION OF A TAILGATE AND ADJUSTING OPERATION OF A USER INTERFACE DEVICE BASED ON THE TAILGATE POSITION

(71) Applicant: GM Global Technology Operations LLC, Detroit, MI (US)

(72) Inventors: Mohannad Murad, Troy, MI (US); Bryan W. Fowler, Shelby Township, MI (US); Princess Len Carlos, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/879,586

(22) Filed: Jan. 25, 2018

(65) Prior Publication Data

US 2019/0228235 A1   Jul. 25, 2019

(51) Int. Cl.
| | |
|---|---|
| *G06K 9/00* | (2006.01) |
| *B60R 11/04* | (2006.01) |
| *B60W 50/14* | (2020.01) |
| *B60R 1/00* | (2006.01) |
| *H04N 7/18* | (2006.01) |

(52) U.S. Cl.
CPC .......... *G06K 9/00791* (2013.01); *B60R 1/002* (2013.01); *B60R 11/04* (2013.01); *B60W 50/14* (2013.01); *B60R 2300/802* (2013.01); *B60W 2050/143* (2013.01); *B60W 2050/146* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 2003/0052969 | A1* | 3/2003 | Satoh | B60R 1/00 348/148 |
| 2014/0071279 | A1* | 3/2014 | Mokashi | H04N 7/18 348/148 |
| 2014/0253300 | A1* | 9/2014 | Herridge | F15B 13/10 340/12.22 |
| 2014/0303849 | A1* | 10/2014 | Hafner | B62D 13/06 701/42 |
| 2015/0054950 | A1* | 2/2015 | Van Wiemeersch | B60R 1/00 348/148 |

(Continued)

OTHER PUBLICATIONS

U.S. Appl. No. 15/482,628, filed Apr. 7, 2017, Makarewicz et al.

(Continued)

*Primary Examiner* — Janese Duley (57) ABSTRACT

A system includes an object identification module, a tailgate position module, and a user interface device (UID) control module. The object identification module is configured to identify at least one of a bumper of a vehicle and a tailgate of the vehicle in an image captured by a camera mounted to the tailgate. The tailgate position module is configured to determine that the tailgate is closed when the bumper is identified in the image, and determine that the tailgate is open when at least one of: the tailgate is identified in the image; and the bumper is not identified in the image. The UID control module is configured to adjust operation of a user interface device based on whether the tailgate is open or closed.

13 Claims, 6 Drawing Sheets

(56) References Cited

U.S. PATENT DOCUMENTS

2015/0183380 A1     7/2015   Da Deppo et al.
2017/0163939 A1     6/2017   Thompson et al.
2018/0001820 A1*   1/2018   Higgins ............. B62D 33/0273

OTHER PUBLICATIONS

"Articulating Back-Up Camera"; Research Disclosure database No. 620063; www.researchdisclosure.com; published in the Dec. 2015 paper journal; published digitally Nov. 23, 2015; 2 pages.

* cited by examiner

SYSTEM AND METHOD FOR DETECTING THE POSITION OF A TAILGATE AND ADJUSTING OPERATION OF A USER INTERFACE DEVICE BASED ON THE TAILGATE POSITION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for detecting a position of a tailgate and adjusting operation of a user interface device based on the tailgate position.

Driver assistance systems have been developed to assist drivers when driving a vehicle in reverse. Some driver assistance systems detect objects behind a vehicle when the vehicle is moving rearward and sound an alarm when an object behind the vehicle is within a predetermined distance of the vehicle. Some driver assistance systems include a camera mounted to the rear end of the vehicle that captures an image of an area rearward of the vehicle, and an electronic display mounted within a cabin of the vehicle that displays the image. In some cases, the electronic display also displays guidelines over the image, and the guidelines represent the expected travel path of the vehicle.

In other cases, the electronic display shows a top view image of the vehicle and an area around the vehicle. The top view image of the vehicle is stored in memory. The top view image of the area around the vehicle is generated based on images captured by cameras mounted on all sides of the vehicle.

SUMMARY

A first system according to the present disclosure includes an object identification module, a tailgate position module, and a user interface device (UID) control module. The object identification module is configured to identify at least one of a bumper of a vehicle and a tailgate of the vehicle in a first image captured by a camera mounted to the tailgate. The tailgate position module is configured to determine that the tailgate is closed when the bumper is identified in the first image captured by the camera, and determine that the tailgate is open when at least one of: the tailgate is identified in the first image captured by the camera; and the bumper is not identified in the first image captured by the camera. The UID control module is configured to control a user interface device to adjust at least one of: a second image displayed by the user interface device; a first time at which a sound is played by the user interface device; and a second time at which a vibration is generated by the user interface device based on whether the tailgate is open or closed.

In one example, the tailgate position module is configured to determine that the tailgate is open when the tailgate is identified in the first image captured by the camera.

In one example, the tailgate position module is configured to determine that the tailgate is open when the bumper is not identified in the first image captured by the camera.

In one example, the first system further includes an object detection module configured to detect an object in the first image captured by the camera, and the object identification module is configured to identify the object as one of the bumper and the tailgate based on at least one of a shape of the object, a size of the object, and a location of the object.

In one example, the object identification module is configured to identify the object as one of the bumper and the tailgate when the shape of the object corresponds to a predetermined shape, the size of the object corresponds to a predetermined size, and the location of the object corresponds to a predetermined location.

In one example, the object identification module is configured to identify the object as the bumper when the object appears at a bottom edge of the first image captured by the camera and the at least one of: the shape of the object corresponds to a predetermined shape of the bumper; and the size of the object corresponds to a predetermined size of the bumper.

In one example, the object identification module is configured to identify the object as the tailgate when the object appears at a top edge of the first image captured by the camera and the at least one of: the shape of the object corresponds to a predetermined shape of the tailgate; and the size of the object corresponds to a predetermined size of the tailgate.

A second system according to the present disclosure includes an object identification module, a tailgate position module, and a user interface device (UID) control module. The object identification module is configured to identify a first object in a first image captured by a first camera mounted to a tailgate of a vehicle. The tailgate position module is configured to determine whether the tailgate is open or closed based on whether the first object is identified in the first image captured by the first camera. The UID control module configured to at least one of: (i) control the user interface device to display a perspective view image of a first area rearward of the vehicle, to display guidelines representing a travel path of the vehicle over the perspective view image, and to adjust the guidelines based on whether the tailgate is open or closed; and (ii) control the user interface device to alert a driver when the vehicle is approaching a second object located rearward of the vehicle and within a first distance of the vehicle, and to adjust the first distance based on whether the tailgate is open or closed.

In one example, the UID control module is configured to control the user interface device to display the perspective view image of the first area rearward of the vehicle, to display the guidelines over the perspective view image, and to adjust the guidelines based on whether the tailgate is open or closed.

In one example, the guidelines indicate a distance from the vehicle to at least one location rearward of the vehicle, and the UID control module is configured to at least one of increase a length of the guidelines and increase a spacing between the guidelines when the tailgate is opened.

In one example, the UID control module is configured to: control the user interface device to alert the driver when the vehicle is approaching the second object and the second object is within the first distance of the vehicle; and adjust the first distance based on whether the tailgate is open or closed.

In one example, the UID control module is configured to adjust the first distance to a first value when the tailgate is closed and adjust the first distance to a second value that is greater than the first value when the tailgate is open.

In one example, the UID control module is configured to control the user interface device to display a top view image of the vehicle and a second area around the vehicle and to adjust the top view image based on whether the tailgate is open or closed.

In one example, the UID control module is configured to: control the user interface device to generate the top view image based on a first portion of the first image captured by the first camera and a second portion of a second image captured by a second camera mounted to a sidewall of the vehicle; and adjust at least one of the first portion of the first image and the second portion of the second image based on whether the tailgate is open or closed.

A third system according to the present disclosure includes a camera, a camera actuator, an object identification module, a tailgate position module, and a user interface device (UID) control module. The camera is configured to be mounted to a tailgate of a vehicle and is configured to capture an image of an area rearward of the vehicle. The camera actuator is configured to: adjust the camera to a first position when the tailgate is closed; and adjust the camera to a second position when the tailgate is open. A field of view of the camera includes a portion of a bumper of the vehicle when the camera is in the first position and the tailgate is closed. The field of view of the camera includes a portion of the tailgate when the camera is in the second position and the tailgate is open. The object identification module is configured to identify at least one of the bumper and the tailgate in the image captured by the camera. The tailgate position module is configured to: determine that the tailgate is closed when the portion of the bumper is identified in the image captured by the camera; and determine that the tailgate is open when the portion of the tailgate is identified in the image captured by the camera. The UID control module is configured to at least one of: (i) control the user interface device to display a perspective view image of a first area rearward of the vehicle, to display guidelines representing a travel path of the vehicle over the perspective view image, and to adjust the guidelines based on whether the tailgate is open or closed; and (ii) control the user interface device to alert a driver when the vehicle is approaching a first object located rearward of the vehicle and within a first distance of the vehicle, and to adjust the first distance based on whether the tailgate is open or closed.

In one example, the third system further includes an object detection module configured to detect a second object in the image captured by the camera, and the object identification module is configured to identify the second object as one of the bumper and the tailgate based on at least one of a shape of the second object, a size of the second object, and a location of the second object.

In one example, the object identification module is configured to identify the second object as the bumper when the second object appears at a bottom edge of the image captured by the camera and the at least one of: the shape of the second object corresponds to a predetermined shape of the portion of the bumper; and the size of the second object corresponds to a predetermined size of the portion of the bumper.

In one example, the object identification module is configured to identify the second object as the tailgate when the second object appears at a top edge of the image captured by the camera and the at least one of: the shape of the second object corresponds to a predetermined shape of the portion of the tailgate; and the size of the second object corresponds to a predetermined size of the portion of the tailgate.

In one example, the UID control module is configured to control the user interface device to display the perspective view image of the first area rearward of the vehicle, to display the guidelines over the perspective view image, and to adjust the guidelines based on whether the tailgate is open or closed.

In one example, the UID control module is configured to: control the user interface device to alert the driver when the vehicle is approaching the first object the first object is within the first distance of the vehicle; and adjust the first distance based on whether the tailgate is open or closed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some driver assistance systems provide assistance to a driver of a vehicle based on inputs from ultrasound sensors mounted to a rear bumper of the vehicle and a rear camera mounted to a tailgate of the vehicle. In one example, a system determines the distance between the vehicle and an object located rearward of the vehicle using the ultrasound sensors, and alerts the driver when the object is within a predetermined distance of the vehicle. In another example, a system includes an electronic display that shows the image captured by the rear camera overlaid with guidelines representing the expected travel path of the vehicle. In another example, a system generates a top view image of the vehicle and an area around the vehicle based on images captured by the rear camera and other cameras mounted to the front and sides of the vehicle, and an electronic display shows the top view image.

If the tailgate is opened and the field of view of the rear camera is unchanged, the rear camera will capture an image of the ground directly below the tailgate. Since this image does not assist the driver, some driver assistance systems adjust the field of view of the rear camera when the tailgate is opened to obtain an image of an area behind the vehicle. In one example, the rear camera is rotated by an amount equal to the amount by which the tailgate rotates when opened, and the rear camera is rotated in a direction opposite of the opening direction of the tailgate.

Although the field of view of the camera may be adjusted in the manner described above when the tailgated is opened, the rear camera image when the tailgate is open may still differ from the rear camera image when the tailgate is closed. This difference in the rear camera image is due to the fact that the height of the rear camera decreases when the tailgate is opened, and due to the fact that the rear camera is disposed further rearward in a fore-aft direction when the tailgate is opened. As a result of this difference in the rear camera image, the guidelines may not represent the expected travel path of the vehicle as accurately as desired. In addition, the areas to the left and right of the open tailgate may not be shown in the top view image of the vehicle and the area around the vehicle.

Since the ultrasound sensors are mounted to the rear bumper rather than the tailgate, the positions of the ultrasound sensors may remain unchanged when the tailgate is opened. However, in determining when to alert the driver as the vehicle is approaching an object located rearward of the vehicle, a system may assume that the tailgate is closed. Thus, if the tailgate is opened, the system may not alert the driver according to desired timing.

A driver assistance system according to the present disclosure addresses these issues by determining when the tailgate is opened or closed and adjusting the guidelines, the top view image, and/or the alert criteria when the tailgate is opened or closed. In one example, the system alerts the driver earlier when the vehicle is approaching an object located rearward of the vehicle and the tailgate is opened. In another example, the system adjusts the curvature of the guidelines, the length of the guidelines, and/or the spacing between the guidelines to account for the change in the image captured by the rear camera when the tailgate is opened. In another example, the system uses a greater portion of the images captured by side cameras to show the areas to the left and right of the open tailgate in the top view image.

The system may determine the position of the tailgate based on an input from a tailgate position sensor. However, the cost of a tailgate position sensor increases the cost of the vehicle. Thus, the system may determine the tailgate position based on whether the rear bumper or the tailgate is identified in the image captured by the rear camera. In one example, the system determines that the tailgate is closed when a rear portion of the rear bumper is identified in the image, and the system determines that the tailgate is open when an upper portion of the tailgate is identified in the image.

Figure 1:
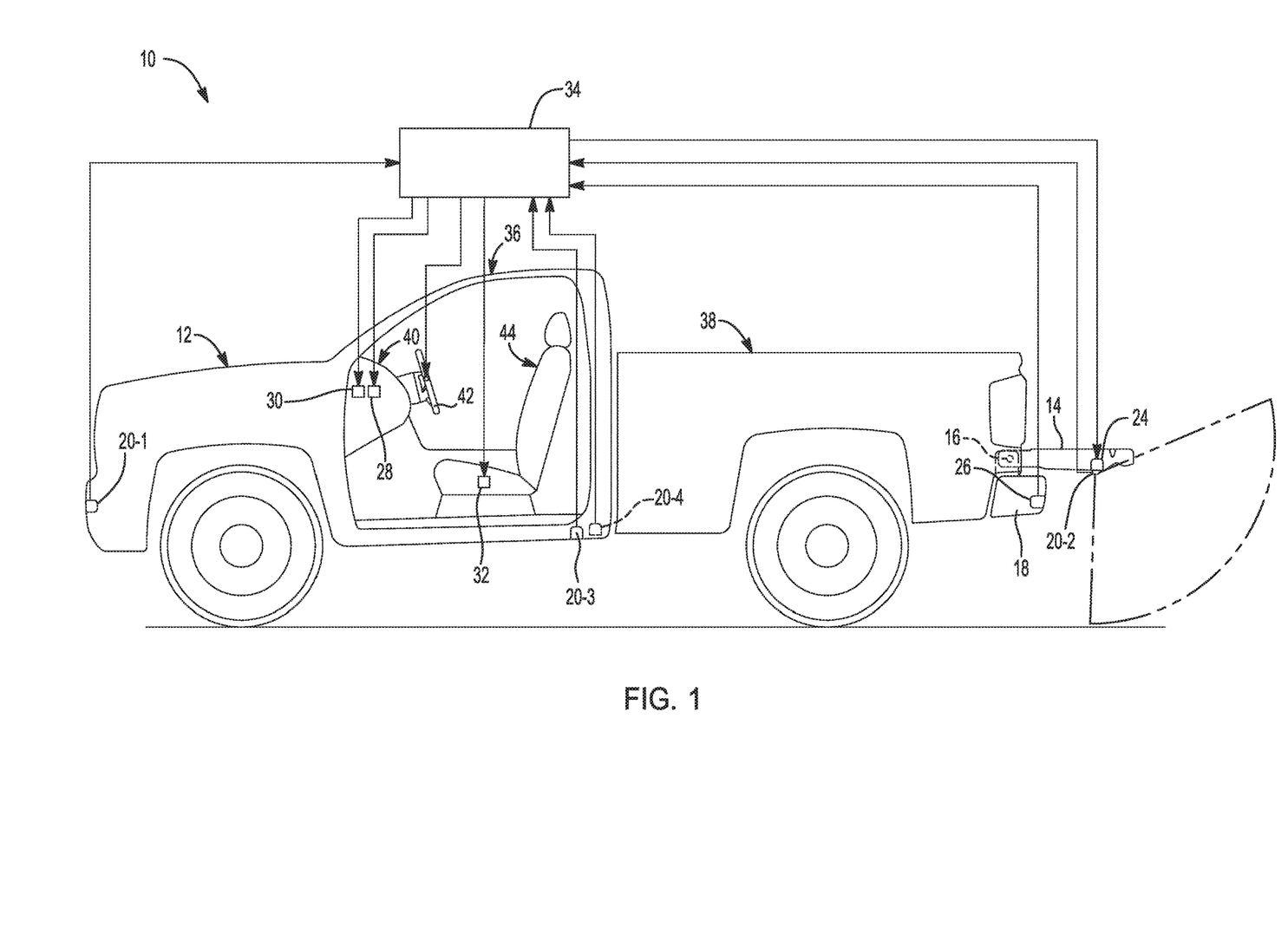
FIG. 1 is a perspective view of an example vehicle according to the principles of the present disclosure.

Referring now to FIG. 1, a vehicle 10 includes a body 12, a tailgate 14 that is pivotable relative to the body 12 about a hinge 16, a rear bumper 18, one or more cameras 20, a camera actuator 24, one or more ultrasound sensors 26, an electronic display 28, a speaker 30, one or more vibrators 32, and a driver assistance module 34. The body 12 includes a passenger cab 36 and a cargo bed 38, and an instrument panel 40, a steering wheel 42, and a driver seat 44 are located within the passenger cab 36. Although the vehicle 10 is depicted as a pickup truck in FIG. 1, the principles of the present disclosure apply to any vehicle with a tailgate.

The cameras 20 include a front camera 20-1, a rear camera 20-2, a left side camera 20-3, and a right side camera 20-4. The front camera 20-1 is mounted to the passenger cab 36 and captures an image of an area forward of the vehicle 10. The rear camera 20-2 is mounted to the tailgate 14 and captures an image of an area rearward of the vehicle 10. The left side camera 20-3 is mounted to the left side of the passenger cab 36 and/or the cargo bed 38 and captures an image of an area to the left of the vehicle 10. The right side camera 20-4 is mounted to the right side of the passenger cab 36 and/or the cargo bed 38 and captures an image of an area to the right of the vehicle 10. In one example, each of the left and right side cameras 20-3 and 20-4 is mounted to an outside rear view mirror of the vehicle 10.

Figure 2:
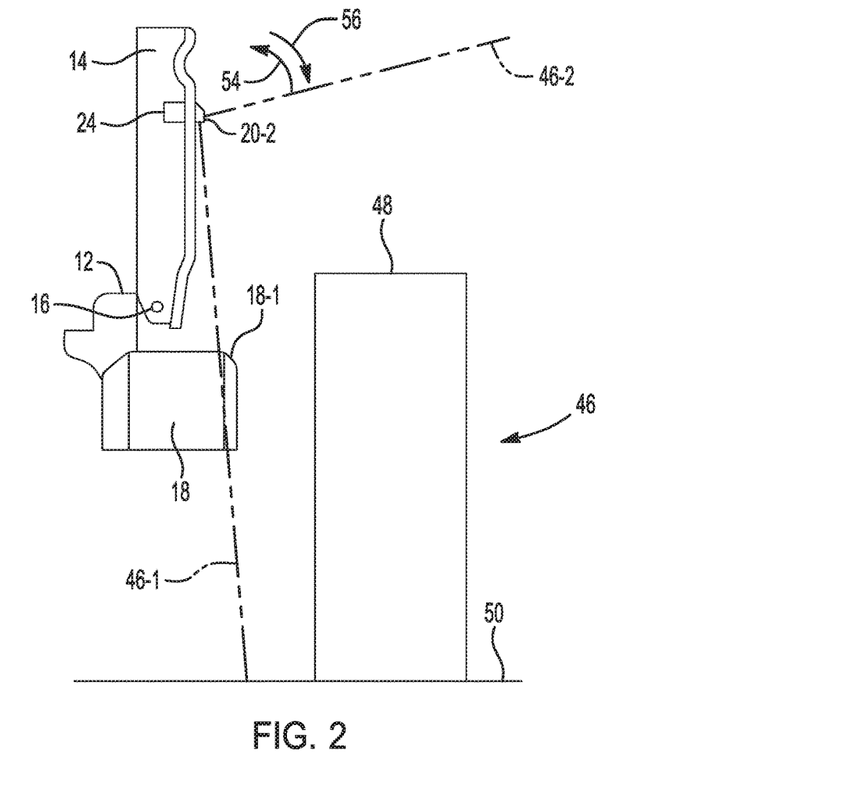
FIGS. 2 and 3 are side views of examples of a rear body portion, a bumper, a tailgate, a tailgate camera, and a camera actuator included in the vehicle of FIG. 1.
Figure 3:
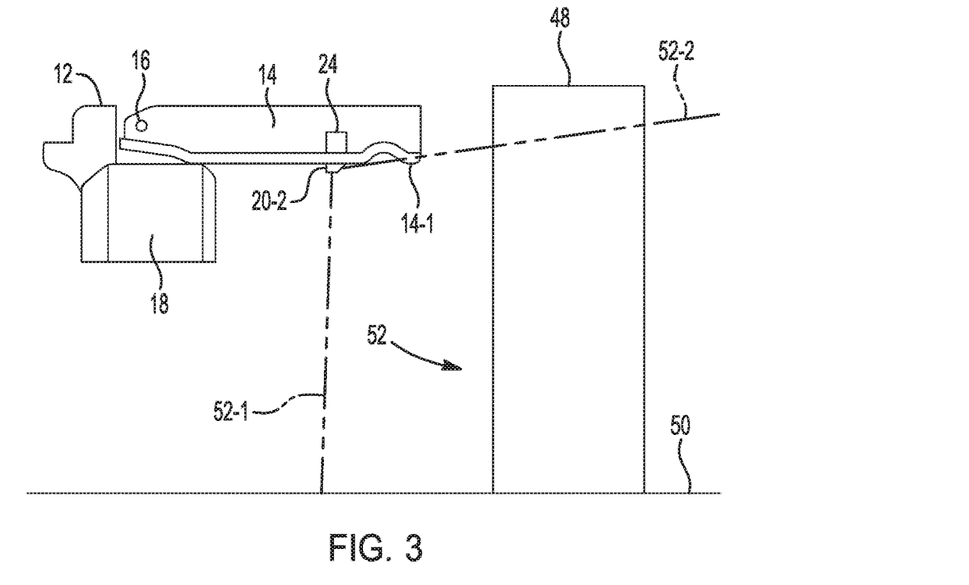

Referring now to FIGS. 2 and 3, the camera actuator 24 adjusts the position of the rear camera 20-2 when the tailgate 14 is opened or closed. The camera actuator 24 adjusts the rear camera 20-2 to a first position when the tailgate 14 is closed (or up) as shown in FIG. 2. When the rear camera 20-2 is in the first position, the rear camera 20-2 has a first field of view 46 that extends between a first boundary 46-1 and a second boundary 46-2. Thus, the first field of view 46 includes a rear portion 18-1 of the rear bumper 18 and an object 48 on ground 50 rearward of the vehicle 10.

The camera actuator 24 adjusts the rear camera 20-2 to a second position when the tailgate 14 is open (or down) as shown in FIG. 3. When the rear camera 20-2 is in the second position, the rear camera 20-2 has a second field of view 52 that extends between a first boundary 52-1 and a second boundary 52-2. Thus, the first field of view 52 includes an upper portion 14-1 of the tailgate 14 and the object 48 on the ground 50 rearward of the vehicle 10.

The camera actuator 24 rotates the rear camera 20-2 by a first amount (e.g., approximately 90 degrees) when adjusting the rear camera 20-2 between the first and second positions. The first amount is approximately equal to the amount by which the tailgate 14 rotates about the hinge 16 when the tailgate 14 is adjusted between its open and closed positions. In addition, the camera actuator 24 rotates the rear camera 20-2 in a first direction 54 when the tailgate 14 is opened and rotates the rear camera 20-2 in a second direction 56 when the tailgate 14 is closed. The first direction 54 is opposite of the direction in which the tailgate 14 rotates when the tailgate 14 is opened, and the second direction 56 is opposite of the direction in which the tailgate 14 rotates when the tailgate 14 is closed.

If the camera actuator 24 did not rotate the rear camera 20-2 when the tailgate 14 is opened, the rear camera 20-2 would capture an image of the ground 50 directly below the tailgate 14 when the tailgate 14 is open. Such an image would not show objects rearward of the vehicle 10, and therefore would not provide assistance to the driver of the vehicle 10. Conversely, since the camera actuator 24 rotates the rear camera 20-2 when the tailgate 14 is opened in the manner described above, the image captured by the rear camera 20-2 when the tailgate 14 is open shows objects rearward of the vehicle 10. However, the image captured by the rear camera 20-2 when the tailgate 14 is open is not identical to the image captured by the rear camera 20-2 when the tailgate 14 is closed due to a difference in the height of the rear camera 20-2. As shown in FIGS. 2 and 3, the height of rear camera 20-2 is greater when the tailgate 14 is closed relative to when the tailgate 14 is open.

The camera actuator 24 may be a mechanical or electromechanical actuator. In one example, the camera actuator 24 includes a hollow spherical segment that is rigidly fixed to the tailgate 14 and a rotatable disc that is rotatably mounted to the hollow spherical segment. In this example, the rear camera 20-2 is attached to the rotatable disc and rotates with the rotatable disc when the tailgate 14 is opened or closed due to, for example, the force of gravity. In another example, the camera actuator 24 includes an electric motor, one or more gears, and/or one or more linkages. In this example, the gears and/or linkages connect the rear camera 20-2 to the electric motor, and therefore the position of the rear camera 20-2 changes when the electric motor rotates.

In various implementations, the field of view of the rear camera 20-2 may be adjusted when the tailgate 14 is opened or closed without adjusting the position of the rear camera 20-2. For example, the rear camera 20-2 may be fixed in the first position regardless of whether the tailgate 14 is open or closed, and the rear camera 20-2 may have the first field of view 46 shown in FIG. 2 when the tailgate 14 is closed. Then, if the tailgate 14 is opened, the view of the rear camera 20-2 may be adjusted so that the rear camera 20-2 has the second field of view 52 shown in FIG. 3. If the field of view of the rear camera 20-2 is adjusted without adjusting the position of the rear camera 20-2, the camera actuator 24 may be omitted. In this example, the rear camera 20-2 may have a maximum field of view of 180 degrees, and only a portion of the maximum field of view of the rear camera 20-2 may be used to achieve the first and second fields of view 46 and 52.

Referring again to FIG. 1, the ultrasound sensors 26 are mounted in the rear bumper 18. Each ultrasound sensor 26 transmits an ultrasound wave in a direction rearward of the vehicle 10 and receives the ultrasound wave after the ultrasound wave has been reflected by an object located rearward of the vehicle 10. The distance between the vehicle 10 and the object located rearward of the vehicle 10 may be determined based on the period from the time when the ultrasound wave is transmitted to the time when the reflected ultrasound wave is received.

The electronic display 28 may be mounted in the instrument panel 40 or at another location where the electronic display 28 is visible to users of the vehicle 10. The speaker 30 may be mounted in the instrument panel 40 or at another location where sound generated by the speaker 30 is hearable to users of the vehicle 10. The vibrators 32 may be mounted in the steering wheel 42, the driver seat 44, and/or another location where vibrations generated by the vibrators 32 are felt by users of the vehicle 10. The electronic display 28, the speaker 30, and the vibrators 32 may be individually or collectively referred to as a user interface device.

The driver assistance module 34 receives inputs from the cameras 20 and the ultrasound sensors 26 and controls the electronic display 28, the speaker 30, and/or the vibrators 32 to provide assistance to a driver of the vehicle 10 based on the inputs received. In one example, the driver assistance module 34 determines the distance to an object located rearward of vehicle 10 based on the input from the ultrasound sensors 26 in the manner described above. The driver assistance module 34 then controls the speaker 30 to generate an audible alarm and/or controls the vibrators 32 to generate a vibration alarm when the object is within a first distance of the vehicle 10. In another example, the driver assistance module 34 controls the electronic display 28 to display a perspective view image of an area rearward of the vehicle 10 based on an input from the rear camera 20-2.

In addition, the driver assistance module 34 may control the electronic display 28 to display guidelines over the perspective view image, where the guidelines represent an expected travel path of the vehicle 10. The driver assistance module 34 may determine the length and shape of the guidelines based on one or more vehicle operating conditions using a predetermined relationship between the vehicle operating conditions and the length and shape of the guidelines. The vehicle operating conditions may include steering wheel angle, vehicle speed, and track width. The driver assistance module 34 may receive the steering wheel angle and the vehicle speed from a steering wheel angle sensor (not shown) and a vehicle speed sensor (not shown), respectively. The track width may be predetermined.

In another example, the driver assistance module 34 controls the electronic display 28 to display a top view image of the vehicle 10 and an area around the vehicle 10 based on an input from the one or more (e.g., all) of the cameras 20. The top view image of the vehicle 10 may be predetermined and stored in the driver assistance module 34. The driver assistance module 34 may generate the top view image of the area around the vehicle 10 based on inputs received from the cameras 20.

The driver assistance module 34 also determines the position of the tailgate 14 (e.g., open or closed) based on the input from the rear camera 20-2 and adjusts operation of the electronic display 28, the speaker 30, and/or the vibrators 32 based on the tailgate position. In one example, the driver assistance module 34 controls the speaker 30 to generate the audible alarm earlier when the vehicle 10 is approaching an object located rearward of the vehicle 10. In another example, the driver assistance module 34 controls the electronic display 28 to adjust the length and shape of the guidelines and/or the spacing between the guidelines based on the tailgate position. In another example, when controlling the electronic display 28, the driver assistance module 34 adjusts the portions of the images captured by the cameras 20 used to generate the top view image of the vehicle 10 and the area around the vehicle 10 and/or adjusts the video processing (e.g., stitching) involved when converting the images captured by the cameras 20 into the top view image.

Figure 4:
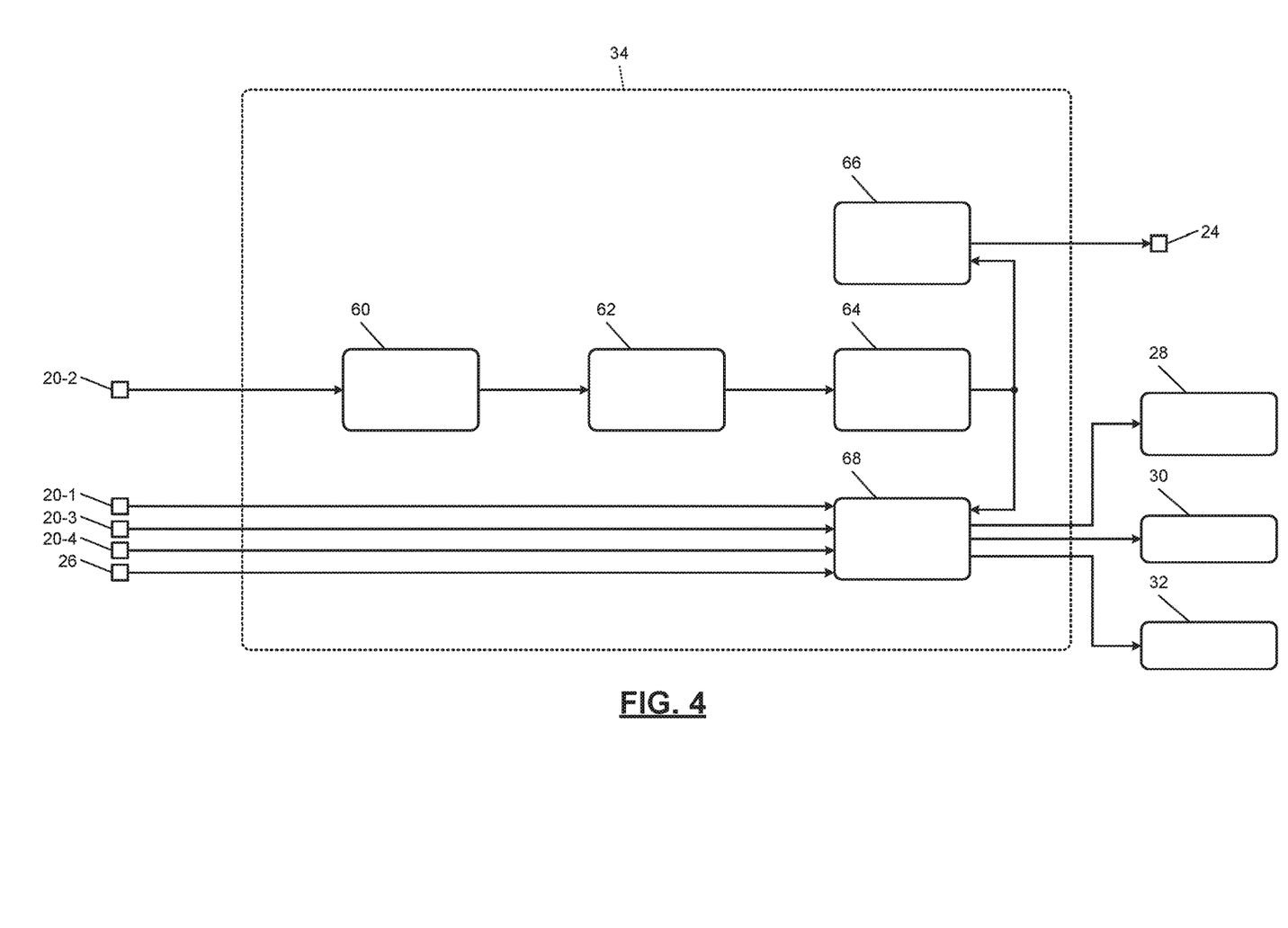
FIG. 4 is a functional block diagram of an example driver assistance control module included in the vehicle of FIG. 1.

Referring now to FIG. 4, an example implementation of the driver assistance module 34 includes an object detection module 60, an object identification module 62, a tailgate position module 64, a camera actuator control module 66, and a user interface device (UID) control module 68. The object detection module 60 detects objects in the image captured by the rear camera 20-2. In one example, when the tailgate 14 is closed as shown in FIG. 2, the object detection module 60 detects the rear portion 18-1 of the rear bumper 18 and/or the object 48 on the ground 50 rearward of the vehicle 10. In another example, when the tailgate 14 is open as shown in FIG. 3, the object detection module 60 detects the upper portion 14-1 of the tailgate 14 and/or the object 48 on the ground 50 rearward of the vehicle 10.

The object detection module 60 may detect objects in the image captured by the rear camera 20-2 based on the color and/or brightness of pixels in the image. The object detection module 60 may detect edges of an object in the image by comparing the color and/or brightness of the pixels in the image. In one example, the object detection module 60 detects the edges of an object at locations where a change in the color and/or brightness of the pixels in the image is greater than a first predetermined amount. The object detection module 60 may determine that the object corresponds to a contiguous group of pixels in the image that is adjacent to and/or within the edges if the color and/or brightness of the pixels are within a predetermined range of the color and/or brightness of the edge pixels. The object detection module 60 may detect objects in the image captured by the rear camera 20-2 using the aforementioned techniques when the vehicle 10 is moving or stopped.

The object detection module 60 may detect objects that are part of the vehicle 10, such as the tailgate 14 or the rear bumper 18, by analyzing the color and/or brightness of the pixels in the image over a predetermined period while the vehicle 10 is moving. In one example, the object detection module 60 detects that a pixel in the image corresponds to a component of the vehicle 10 when a change in the color and/or brightness of the pixel over the predetermined period of vehicle motion is less than a predetermined amount. The object detection module 60 may not detect an object in this manner unless at least a predetermined number of contiguous pixels satisfy this criteria. For example, the object detection module 60 may detect that a group of contiguous pixels in the image corresponds to a component of the vehicle 10 when changes in the color and/or brightness of the pixels over the predetermined period of vehicle motion are less than the predetermined amount and the number of pixels in the group is greater than or equal to the predetermined number.

The object detection module 60 outputs a signal indicating the size, shape, and/or location of objects detected in the image captured by the rear camera 20-2. The object detection module 60 may communicate the size, shape, and/or location of an object detected in the image using coordinates of pixels representing the object relative to one or more outer edges of the image. The signal output by the object detection module 60 may also indicate whether the object is part of the vehicle 10. For example, the signal output by the object detection module 60 may indicate that an object is part of the vehicle 10 when the criteria used to detect the object includes whether a change in the color and/or brightness of a pixel over the predetermined period of vehicle motion is less than the predetermined amount.

The object identification module 62 identifies objects in the image captured by the rear camera 20-2 based on the size, shape, and/or location of the objects. The object identification module 62 may identify an object as the rear bumper 18 when the object appears at a bottom edge 70 (FIG. 5) of the image and/or in a lower half 72 (FIG. 5) of the image. The object identification module 62 may identify an object as the rear bumper 18 when the shape of the object corresponds to a predetermined shape of the rear portion 18-1 of the rear bumper 18 and/or the size of the object corresponds to a predetermined size of the rear portion 18-1. The object identification module 62 may determine whether an object corresponds to the rear bumper 18 using a combination of two or more of the location, size, and shape criteria set forth above.

The object identification module 62 may identify an object as the tailgate 14 when the object appears at an upper edge 74 (FIG. 6) of the image and/or in an upper half 76 (FIG. 6) of the image. The object identification module 62 may identify an object as the tailgate 14 when the shape of the object corresponds to a predetermined shape of the upper portion 14-1 of the tailgate 14 and/or the size of the object corresponds to a predetermined size of the upper portion 14-1. The object identification module 62 may determine whether an object corresponds to the tailgate 14 using a combination of two or more of the location, size, and shape criteria set forth above. The object identification module 62 outputs a signal indicating whether the tailgate 14 and/or the bumper 18 is/are identified in the image.

The predetermined locations, shapes and sizes of the upper portion 14-1 of the tailgate 14 and the rear portion 18-1 of the rear bumper 18 may be stored in the object identification module 62 when the vehicle 10 is assembled. For example, a background may be placed behind the vehicle 10 so that no objects other than the tailgate 14 and the rear bumper 18 appear in the images captured by the rear camera 20-2. Then, when the tailgate 14 is closed, the rear camera 20-2 may be adjusted to the first position, and the location, shape and size of the object detected in the image may be used as the predetermined location, shape and size of the rear bumper portion 18-1. Similarly, when the tailgate 14 open, the rear camera 20-2 may be adjusted to the second position, and the location, shape and size of the object detected in the image may be used as the predetermined shape and size of the upper tailgate portion 14-1. Additionally or alternatively, the predetermined locations, shapes and sizes of the upper portion 14-1 of the tailgate 14 and the rear portion 18-1 of the rear bumper 18 may be obtained from a mathematical and/or three-dimensional model of the vehicle 10.

Additionally or alternatively, the object identification module 62 may learn or adjust the predetermined locations, shapes and sizes of the upper portion 14-1 of the tailgate 14 and the rear portion 18-1 of the rear bumper 18 while the vehicle 10 is moving. For example, the UID control module 68 may control the electronic display 28 and/or the speaker 30 to prompt the driver to drive the vehicle 10 with the tailgate 14 closed for a predetermined period (e.g., a period from 5 minutes to 10 minutes). Then, while the vehicle 10 is moving, the object detection module 60 may determine which pixels in the image captured by the rear camera 20-2 corresponds to a component of the vehicle 10. The location, shape and size of that component may be used as the predetermined location, shape and size of the rear bumper portion 18-1. This process may be repeated with the tailgate 14 open to obtain the predetermined location, shape and size of the upper tailgate portion 14-1.

The tailgate position module 64 determines the position of the tailgate 14 based on whether the tailgate 14 and/or the rear bumper 18 is/are identified in the image captured by the rear camera 20-2. The tailgate position module 64 may determine that the tailgate 14 is closed when the rear bumper 18, or the rear portion 18-1 thereof, is identified in the image. The tailgate position module 64 may determine that the tailgate 14 is open when the tailgate 14, or the upper portion 14-1 thereof, is identified in the image. Additionally or alternatively, the tailgate position module 64 may determine that the tailgate 14 is open when the rear bumper 18, or the rear portion 18-1 thereof, is not identified in the image. For example, the tailgate position module 64 may determine that the tailgate 14 is open when the upper portion 14-1 of the tailgate 14 is identified in the image and the rear portion 18-1 of the rear bumper 18 is not identified in the image.

The tailgate position module 64 may determine that the tailgate 14 has been closed or open and the field of view of the rear camera 20-2 has not yet been adjusted in response thereto when the predetermined locations, shapes and sizes of both the upper portion 14-1 of the tailgate 14 and the rear portion 18-1 of the rear bumper 18 are not identified in the image captured by the rear camera 20-2. In other words, the tailgate position module 64 may determine that the tailgate 14 has been closed or open and the field of view of the rear camera 20-2 has not yet been adjusted in response thereto when no object identified in the image has a location, shape, and size corresponding to the predetermined location, shape and size the upper portion 14-1 or the rear portion 18-1. For example, the tailgate position module 64 may determine that the tailgate 14 is open and the rear camera 20-2 is in the first position (i.e., the rear camera position corresponding to the tailgate closed position) when the predetermined locations, shapes and sizes of both the upper portion 14-1 of the tailgate 14 and the rear portion 18-1 of the rear bumper 18 are not identified in the image captured by the rear camera 20-2 and the last tailgate position determined is closed (assuming that the rear camera 20-2 did not lose power since the last tailgate position was determined). Conversely, the tailgate position module 64 may determine that the tailgate 14 is closed and the rear camera 20-2 is in the second position (i.e., the rear camera position corresponding to the tailgate open position) when the predetermined locations, shapes and sizes of both the upper portion 14-1 of the tailgate 14 and the rear portion 18-1 of the rear bumper 18 are not identified in the image captured by the rear camera 20-2 and the last tailgate position determined is open (assuming that the rear camera 20-2 did not lose power since the last tailgate position was determined).

The above technique for determining that the tailgate 14 has been closed or open and the field of view of the rear camera 20-2 has not yet been adjusted in response thereto accounts for the fact that the tailgate 14 or the rear bumper 18 may still be within the field of view of the rear camera 20-2, albeit different portions thereof. For example, if the tailgate 14 is adjusted from its open position (FIG. 2) to its closed position (FIG. 3) and the field of view of the rear camera 20-2 is not adjusted in response thereto, the image captured by the rear camera 20-2 may actually include a greater portion of the rear bumper 18 than when the tailgate 14 is closed. However, the portion of the rear bumper 18 included in the image will not match the predetermined location, shape, and size of the rear portion 18-1 of the rear bumper 18.

The tailgate position module 64 outputs a signal indicating the tailgate position. The signal output by the tailgate position module 64 may also indicate whether the tailgate 14 has been closed or open and/or whether the field of view of the rear camera 20-2 has been adjusted in response thereto. For example, the signal output by the tailgate position module 64 may also indicate when the tailgate 14 is open and the rear camera 20-2 is in the first position and/or when the tailgate 14 is closed and the rear camera 20-2 is in the second position.

The camera actuator control module 66 controls the camera actuator 24 to adjust the position of the rear camera 20-2 when the tailgate 14 is opened or closed. The camera actuator control module 66 controls the camera actuator 24 to adjust the rear camera 20-2 to the first position when the tailgate 14 is closed. The camera actuator control module 66 controls the camera actuator 24 to adjust the rear camera 20-2 to the second position when the tailgate 14 is opened.

In various implementations, the driver assistance module 34 and/or the rear camera 20-2 may include a camera control module (not shown) that adjusts the field of view of the rear camera 20-2 without adjusting the position of the rear camera 20-2. For example, the rear camera 20-2 may be fixed in the first position regardless of whether the tailgate 14 is open or closed, and the camera control module may adjust the view of the rear camera 20-2 so that the rear camera 20-2 has the first field of view 46 shown in FIG. 2 when the tailgate 14 is closed. Then, if the tailgate 14 is opened, the camera control module may adjust the view of the rear camera 20-2 so that the rear camera 20-2 has the second field of view 52 shown in FIG. 3. In this example, the rear camera 20-2 may have a maximum field of view of 180 degrees, and the camera control module may adjust which portion of the maximum field of view of the rear camera 20-2 is used to achieve the first or second field of view 46 or 52. If the field of view of the rear camera 20-2 is adjusted without adjusting the position of the rear camera 20-2, the camera actuator 24 and the camera actuator control module 66 may be omitted.

The camera actuator control module 66 and/or the camera control module may determine when the tailgate 14 is opened or closed based on the signal output from the tailgate position module 64. For example, the signal output from the tailgate position module 64 may indicate that the tailgate 14 has been opened and the rear camera 20-2 is the first position. In response to this, the camera actuator control module 66 may control the camera actuator 24 to adjust the rear camera 20-2 to the second position. In another example, signal output from the tailgate position module 64 may indicate that the tailgate 14 has been closed and the rear camera 20-2 is the second position. In response to this, the camera actuator control module 66 may control the camera actuator 24 to adjust the rear camera 20-2 to the first position.

Additionally or alternatively, the camera actuator control module 66 and/or the camera control module may determine when the tailgate 14 is opened or closed based on an input from a tailgate position sensor (not shown). The tailgate position sensor may be an inclinometer that determines the orientation of the tailgate 14 with respect to gravity, a Hall effect sensor that detects a change in a magnetic field generated by a magnet mounted to the tailgate 14, or a latch sensor that detects whether or not a latch of the tailgate 14 is engaged. If the tailgate position sensor is a latch sensor, the camera actuator control module 66 may determine that the tailgate 14 is closed when tailgate 14 is latched and determine that the tailgate 14 is open when tailgate 14 is not latched. If the camera actuator control module 66 determines when the tailgate 14 is opened or closed based on the signal from the tailgate position module 64 (i.e., independent of the tailgate position sensor), the tailgate position sensor may be omitted.

The UID control module 68 controls the electronic display 28, the speaker 30, and/or the vibrators 32 to provide assistance to the driver of the vehicle 10 based on inputs from the cameras 20 and the ultrasound sensors 26. In one example, the UID control module 68 determines the distance to an object located rearward of vehicle 10 based on the input from the ultrasound sensors 26 in the manner described above. The UID control module 68 then controls the speaker 30 to generate the audible alarm and/or controls the vibrators 32 to generate the vibration alarm when the object is within the first distance of the vehicle 10. The first distance may be referred to as a rear impact alert range.

In another example, the UID control module 68 controls the electronic display 28 to display a perspective view image of an area rearward of the vehicle 10 based on an input from the rear camera 20-2. The UID control module 68 may control the electronic display 28 to display the entire image captured by the rear camera 20-2 or only a portion thereof. In addition, the UID control module 68 may control the electronic display 28 to display guidelines over the perspective view image, where the guidelines represent an expected travel path of the vehicle 10. The UID control module 68 may determine the length and shape of the guidelines based on one or more vehicle operating conditions using a predetermined relationship between the vehicle operating conditions and the length and shape of the guidelines. The vehicle operating conditions may include steering wheel angle, vehicle speed, and track width. The UID control module 68 may receive the steering wheel angle and the vehicle speed from the steering wheel angle sensor and the vehicle speed sensor, respectively. The track width may be predetermined.

In another example, the UID control module 68 controls the electronic display 28 to display a top view image of the vehicle 10 and an area around the vehicle 10 based on an input from the one or more (e.g., all) of the cameras 20. The top view image of the vehicle 10 may be predetermined and stored in the UID control module 68. The UID control module 68 may generate the top view image of the area around the vehicle 10 based inputs received from the cameras 20.

The UID control module 68 also adjusts the operation of the electronic display 28, the speaker 30, and/or the vibrators 32 based on the position of the tailgate 14. In one example, the UID control module 68 controls the speaker 30 and the vibrators 32 to generate the audible alarm and the vibration alarm earlier when the vehicle 10 is approaching an object located rearward of the vehicle 10. The UID control module 68 may accomplish this by increasing the first distance when the tailgate 14 is open relative to the first distance when the tailgate 14 is closed. Since the UID control module 68 controls the speaker 30 and the vibrators 32 to generate the alarms when the object is within the first distance of the vehicle, increasing the first distance causes the alarms to be generated sooner.

Figure 5:
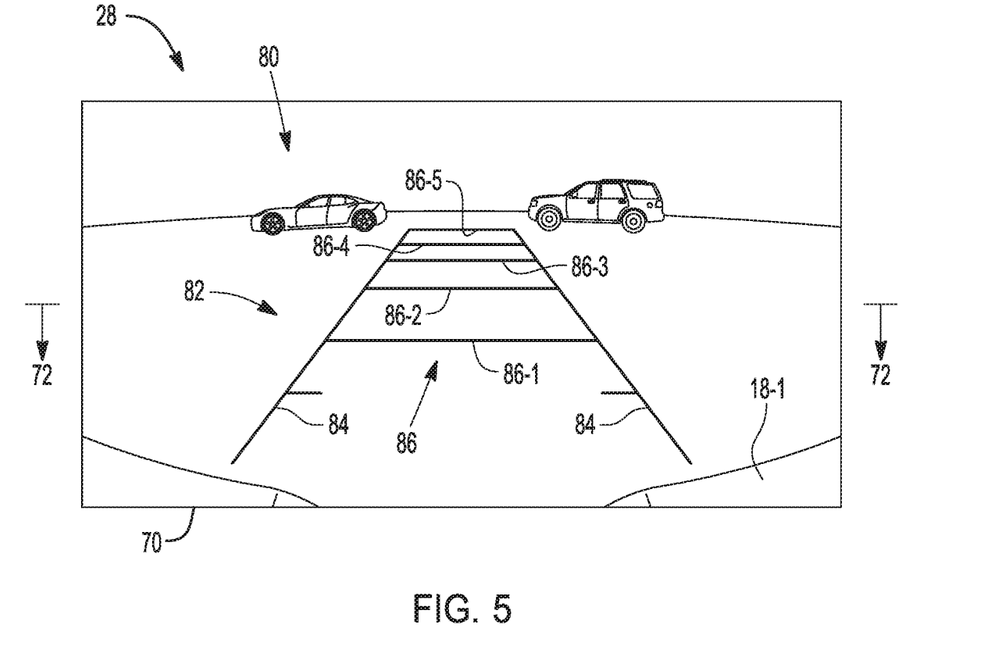
FIGS. 5 and 6 are examples of perspective view images and guidelines displayed by a user interface device included the vehicle of FIG. 1.
Figure 6:
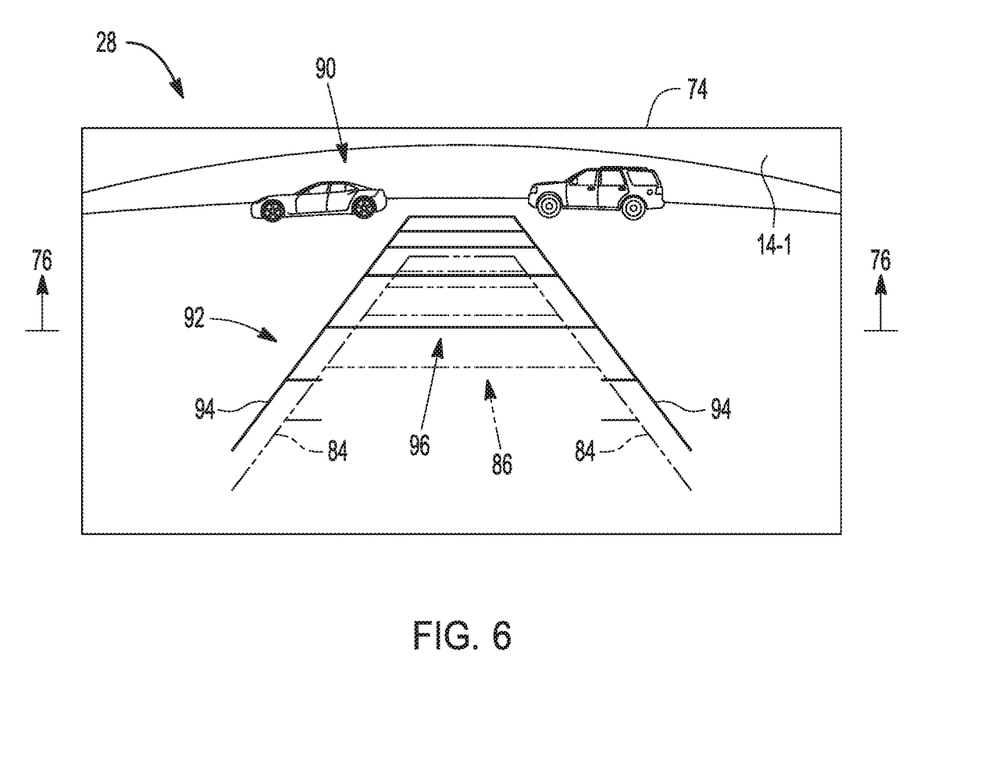

In another example, the UID control module 68 controls the electronic display 28 to adjust the length of the guidelines and the spacing between the guidelines based on the tailgate position. FIGS. 5 and 6 illustrate this control aspect. FIG. 5 shows a perspective view image 80 captured by the rear camera 20-2 and displayed by the electronic display 28 when the tailgate 14 is closed. FIG. 5 also shows guidelines 82 generated by the UID control module 68 and displayed by the electronic display 28 when the tailgate 14 is closed. The guidelines 82 include wheel lines 84 indicating the expected travel path of wheels of the vehicle 10 and distance lines 86 indicating the distance between a rearmost edge of the vehicle 10 and locations in the perspective view image 80. The distance lines 86 include a first distance line 86-1 representing a first distance (e.g., 1 meter) from the rearmost edge, a second distance line 86-2 representing a second distance (e.g., 2 meters) from the rearmost edge, a third distance line 86-3 representing a third distance (e.g., 3 meters) from the rearmost edge, a fourth distance line 86-4 representing a fourth distance (e.g., 4 meters) from the rearmost edge, and a fifth distance line 86-5 representing a fifth distance (e.g., 5 meters) from the rearmost edge.

FIG. 6 shows a perspective view image 90 captured by the rear camera 20-2 and displayed by the electronic display 28 when the tailgate 14 is open. FIG. 6 also shows the guidelines 82 discussed with reference to FIG. 5, as well as guidelines 92 generated by the UID control module 68 and displayed by the electronic display 28 when the tailgate 14 is open. The guidelines 92 include wheel lines 94 and distance lines 96 that are similar to the wheel lines 84 and the distance lines 86, respectively. However, UID control module 68 has adjusted the spacing between the distance lines 96 relative to the spacing between the distance lines 86 to account for the change in the height and orientation of the rear camera 20-2 as the tailgate 14 is opened. Thus, in contrast to the distance lines 86 in FIG. 6, the distance lines 96 accurately reflect the distances from the rearmost edge of the vehicle 10 to locations in the image captured by the rear camera 20-2.

Figure 7:
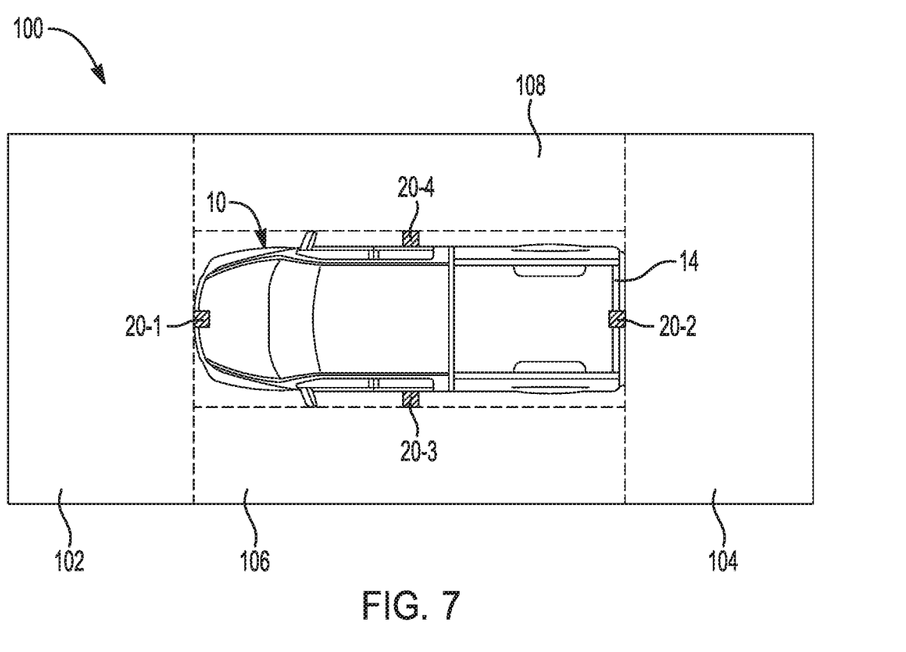
FIGS. 7 and 8 are examples of top view images displayed by the user interface device.
Figure 8:
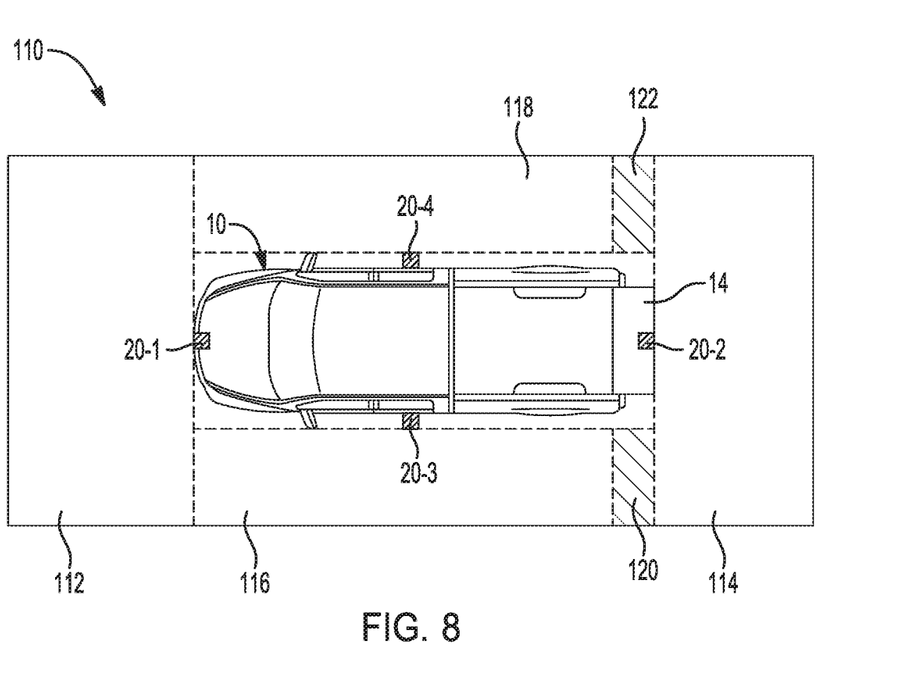

Referring again to FIG. 4, when controlling the electronic display 28, the UID control module 68 may also adjust the portions of the images captured by the cameras 20 used to generate the top view image of the vehicle 10 and the area around the vehicle 10. This control aspect is illustrated in FIGS. 7 and 8. FIG. 7 shows a top view image 100 of the vehicle 10 and an area around the vehicle 10 when the tailgate 14 is closed. The UID control module 68 generates the top view image 100 based on images captured by the cameras 20 and controls the electronic display 28 to display the top view image 100. In various implementations, the UID control module 68 may incorporate a video processing module that generates the top view image 100 as described above.

The area around the vehicle 10 includes a first rectangular area 102 forward of the vehicle 10, a second rectangular area 104 rearward of the vehicle 10, a third rectangular area 106 to the left of the vehicle 10, and a fourth rectangular area 108 to the right of the vehicle 10. The UID control module 68 may generate the top view image of the first, second, third, and fourth rectangular areas 102, 104, 106, and 108 based on the images captured by the first, second, third, and fourth cameras 20-1, 20-2, 20-3, and 20-4, respectively. For example, the UID control module 68 may select a portion or percentage (e.g., less than 100 percent) of the perspective view image captured by the rear camera 20-2 and transform the selected portion of the perspective view image into the top view image of the second rectangular area 104. The UID control module 68 may produce the top view images of the first, third, and fourth rectangular areas 102, 106, and 108 in a similar manner.

FIG. 8 shows a top view image 110 of the vehicle 10 and the area around the vehicle 10 when the tailgate 14 is open. The UID control module 68 generates the top view image 110 based on images captured by the cameras 20 and controls the electronic display 28 to display the top view image 110. The area around the vehicle 10 includes a first rectangular area 112 forward of the vehicle 10, a second rectangular area 114 rearward of the vehicle 10, a third rectangular area 116 to the left of the vehicle body 12, and a fourth rectangular area 118 to the right of the vehicle body 12, a fifth rectangular area 120 to the left of the tailgate 14, and a sixth rectangular area 122 to the right of the tailgate 14.

The first, third, and fourth rectangular areas 112, 116, and 118 are identical to the first, third and fourth rectangular areas 102, 106, and 108 shown in FIG. 7. However, since the tailgate 14 is open in FIG. 8, the second rectangular area 114 is shifted rearward and the size of the second rectangular area 114 is reduced relative to the second rectangular area 104 of FIG. 7. Therefore, the areas to the left and right of the vehicle 10 include the fifth and sixth rectangular areas 120 and 122, respectively, in addition to the third and fourth rectangular areas 104 and 106, respectively.

To account for the rearward shift of the second rectangular area 114 due to the tailgate 14 being open, the UID control module 68 may use a greater portion of the images captured by the third and fourth cameras 20-3 and 20-4. For example, the UID control module 68 may use the image captured by the third camera 20-3 to generate top view images of both the third rectangular area 116 and the fifth rectangular area 120 instead of only the third rectangular area 116. Similarly, the UID control module 68 may use the image captured by the fourth camera 20-4 to generate top view images of both the fourth rectangular area 118 and the sixth rectangular area 122 instead of only the fourth rectangular area 118.

Figure 9:
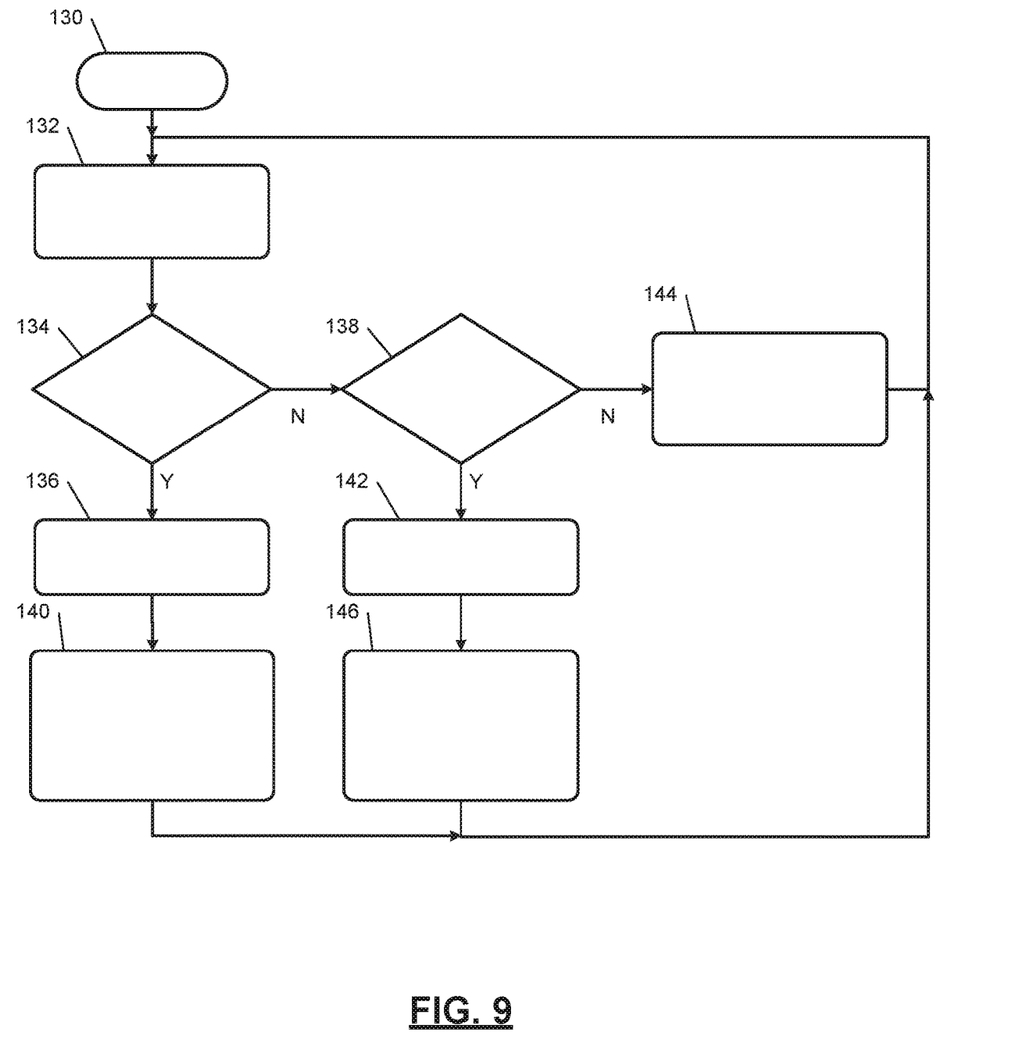
FIG. 9 is a flowchart illustrating an example method for detecting a position of the tailgate and adjusting operation of the user interface device based on the tailgate position.

Referring now to FIG. 9, an example method for detecting the position of the tailgate 14 and adjusting operation of the electronic display 28, the speaker 30, and/or the vibrators 32 based on the tailgate position begins at 130. The method is described in the context of the modules of FIG. 4. However, the particular modules that perform the steps of the method may be different than the modules mentioned below, or the method may be implemented apart from the modules of FIG. 4.

At 132, the object detection module 60 detects object(s) in the image captured by the rear camera 20-2. At 134, the object identification module 62 determines whether an object detected in the image captured by the rear camera 20-2 corresponds to the rear bumper 18. If an object detected in the image captured by the rear camera 20-2 corresponds to the rear bumper 18, the method continues at 136. Otherwise, the method continues at 138.

At 136, the tailgate position module 64 determines that the tailgate 14 is closed. At 140, the UID control module 68 adjusts the rear impact alert range, the guidelines, and/or the top view image of the vehicle 10 and the area around the vehicle 10 to predetermined settings for when the tailgate 14 is closed. For example, the UID control module 68 may adjust the first distance to a first predetermined value, adjust the spacing between the distance guidelines to a second predetermined value, and/or adjust the portions of the images captured by the third and fourth cameras 20-3 and 20-4 to a first percentage.

At 138, the object identification module 62 determines whether an object detected in the image captured by the rear camera 20-2 corresponds to the tailgate 14. If an object detected in the image captured by the rear camera 20-2 corresponds to the tailgate 14, the method continues at 142. Otherwise, the method continues at 144.

At 142, the tailgate position module 64 determines that the tailgate 14 is open. At 146, the UID control module 68 adjusts the rear impact alert range, the guidelines, and/or the top view image of the vehicle 10 and the area around the vehicle 10 to predetermined settings for when the tailgate 14 is open. For example, the UID control module 68 may adjust the first distance to a third predetermined value, adjust the spacing between the distance guidelines to a fourth predetermined value, and/or adjust the portions of the images captured by the third and fourth cameras 20-3 and 20-4 to a second percentage. The first and second percentages may be predetermined and/or the second percentage may be greater than the first percentage.

At 144, the tailgate position module 64 determines the position of the tailgate 14, and the camera actuator control module 66 controls the camera actuator 24 to adjust the position of the rear camera 20-2 based on the tailgate position. For example, if the last tailgate position determined is closed, the tailgate position module 64 determines that the tailgate 14 is open. Therefore, the camera actuator control module 66 controls the camera actuator 24 to adjust the rear camera 20-2 to the second position. Conversely, if the last tailgate position determined is open, the tailgate position module 64 determines that the tailgate 14 is closed. Therefore, the camera actuator control module 66 controls the camera actuator 24 to adjust the rear camera 20-2 to the first position.

In various implementations, the camera actuator control module 66 may control the camera actuator 24 independent of the tailgate position determined by the tailgate position module 64. For example, the camera actuator control module 66 may control the camera actuator 24 based on an input from the tailgate position sensor as discussed above. In various implementations, 138 may be omitted. In addition, if the object identification module 62 determines at 134 that no object detected in the image captured by rear camera 20-2 corresponds to the rear bumper 18, the method may continue directly to 142.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    an object detection circuit configured to detect a first object in a first image captured by a camera mounted to a tailgate of a vehicle;
    an object identification circuit configured to identify the first object as one of the tailgate and a bumper of the vehicle when at least one of:
    a shape of the first object corresponds to a predetermined shape;
    a size of the first object corresponds to a predetermined size; and
    a location of the first object corresponds to a predetermined location;
    a tailgate position circuit configured to:
    determine that the tailgate is closed based on the bumper being identified in the first image captured by the camera; and
    determine that the tailgate is open based on:
    the tailgate being identified in the first image captured by the camera; and
    the bumper not being identified in the first image captured by the camera; and
    a user interface device (UID) control circuit configured to at least one of:
    control a user interface device to display a perspective view image of a first area rearward of the vehicle, to display guidelines representing a travel path of the vehicle over the perspective view image, and to adjust the guidelines based on whether the tailgate is open or closed; and
    control the user interface device to alert a driver when the vehicle is approaching a second object located rearward of the vehicle and within a first distance of the vehicle, and to adjust the first distance based on whether the tailgate is open or closed, wherein the user interface device alerts the driver by at least one of playing a sound and generating a vibration.

2. The system of claim 1 wherein the object identification circuit is configured to identify the first object as the bumper when the first object appears at a bottom edge of the first image captured by the camera and the at least one of:
    the shape of the first object corresponds to the predetermined shape of the bumper; and
    the size of the first object corresponds to the predetermined size of the bumper.

3. The system of claim 1 wherein the object identification circuit is configured to identify the first object as the tailgate when the first object appears at a top edge of the first image captured by the camera and the at least one of:
    the shape of the first object corresponds to the predetermined shape of the tailgate; and
    the size of the first object corresponds to the predetermined size of the tailgate.

4. A system comprising:
    an object detection circuit configured to detect a first object in a first image captured by a camera mounted to a tailgate of a vehicle;
    an object identification circuit configured to identify the first object as one of a bumper of the vehicle and the tailgate when at least one of:
    a shape of the first object corresponds to a predetermined shape;
    a size of the first object corresponds to a predetermined size; and
    a location of the first object corresponds to a predetermined location;

a tailgate position circuit configured to:
determine that the tailgate is closed based on the bumper being identified in the first image captured by the camera;
determine that the tailgate is open based on:
the tailgate being identified in the first image captured by the camera; and
the bumper not being identified in the first image captured by the camera; and
a user interface device (UID) control circuit configured to at least one of:
control the user interface device to display a perspective view image of a first area rearward of the vehicle, to display guidelines representing a travel path of the vehicle over the perspective view image, and to adjust the guidelines based on whether the tailgate is open or closed; and
control the user interface device to alert a driver when the vehicle is approaching a second object located rearward of the vehicle and within a first distance of the vehicle, and to adjust the first distance based on whether the tailgate is open or closed.

5. The system of claim 4 wherein the UID control circuit is configured to control the user interface device to display the perspective view image of the first area rearward of the vehicle, to display the guidelines over the perspective view image, and to adjust the guidelines based on whether the tailgate is open or closed.

6. The system of claim 5 wherein:
the guidelines indicate a distance from the vehicle to at least one location rearward of the vehicle; and
the UID control circuit is configured to at least one of increase a length of the guidelines and increase a spacing between the guidelines when the tailgate is opened.

7. The system of claim 4 wherein the UID control circuit is configured to:
control the user interface device to alert the driver when the vehicle is approaching the second object and the second object is within the first distance of the vehicle; and
adjust the first distance based on whether the tailgate is open or closed.

8. The system of claim 7 wherein the UID control circuit is configured to adjust the first distance to a first value when the tailgate is closed and adjust the first distance to a second value that is greater than the first value when the tailgate is open.

9. A system comprising:
a camera configured to be mounted to a tailgate of a vehicle and configured to capture an image of an area rearward of the vehicle;
a camera actuator configured to:
adjust the camera to a first position when the tailgate is closed, wherein a field of view of the camera includes a portion of a bumper of the vehicle when the camera is in the first position and the tailgate is closed; and
adjust the camera to a second position when the tailgate is open, wherein the field of view of the camera includes a portion of the tailgate when the camera is in the second position and the tailgate is open;
an object detection circuit configured to detect a first object in a first image captured by the camera;
an object identification circuit configured to identify of the first object as one of the bumper and the tailgate when at least one of:
a shape of the first object corresponds to a predetermined shape;
a size of the first object corresponds to a predetermined size; and
a location of the first object corresponds to a predetermined location;
a tailgate position circuit configured to:
determine that the tailgate is closed based on the portion of the bumper being identified in the image captured by the camera; and
determine that the tailgate is open based on:
the portion of the tailgate being identified in the image captured by the camera; and
the portion of the bumper not being identified in the image captured by the camera; and
a user interface device (UID) control circuit configured to at least one of:
control the user interface device to display a perspective view image of a first area rearward of the vehicle, to display guidelines representing a travel path of the vehicle over the perspective view image, and to adjust the guidelines based on whether the tailgate is open or closed; and
control the user interface device to alert a driver when the vehicle is approaching a second object located rearward of the vehicle and within a first distance of the vehicle, and to adjust the first distance based on whether the tailgate is open or closed.

10. The system of claim 9 wherein the object identification circuit is configured to identify the first object as the bumper when the second first object appears at a bottom edge of the image captured by the camera and the at least one of:
the shape of the first object corresponds to the predetermined shape of the portion of the bumper; and
the size of the first object corresponds to the predetermined size of the portion of the bumper.

11. The system of claim 9 wherein the object identification circuit is configured to identify the first object as the tailgate when the first object appears at a top edge of the image captured by the camera and the at least one of:
the shape of the first object corresponds to the predetermined shape of the portion of the tailgate; and
the size of the first object corresponds to the predetermined size of the portion of the tailgate.

12. The system of claim 9 wherein the UID control circuit is configured to control the user interface device to display the perspective view image of the first area rearward of the vehicle, to display the guidelines over the perspective view image, and to adjust the guidelines based on whether the tailgate is open or closed.

13. The system of claim 9 wherein the UID control circuit is configured to:
control the user interface device to alert the driver when the vehicle is approaching the second object and the second object is within the first distance of the vehicle; and
adjust the first distance based on whether the tailgate is open or closed.

* * * * *